UNITED STATES PATENT OFFICE.

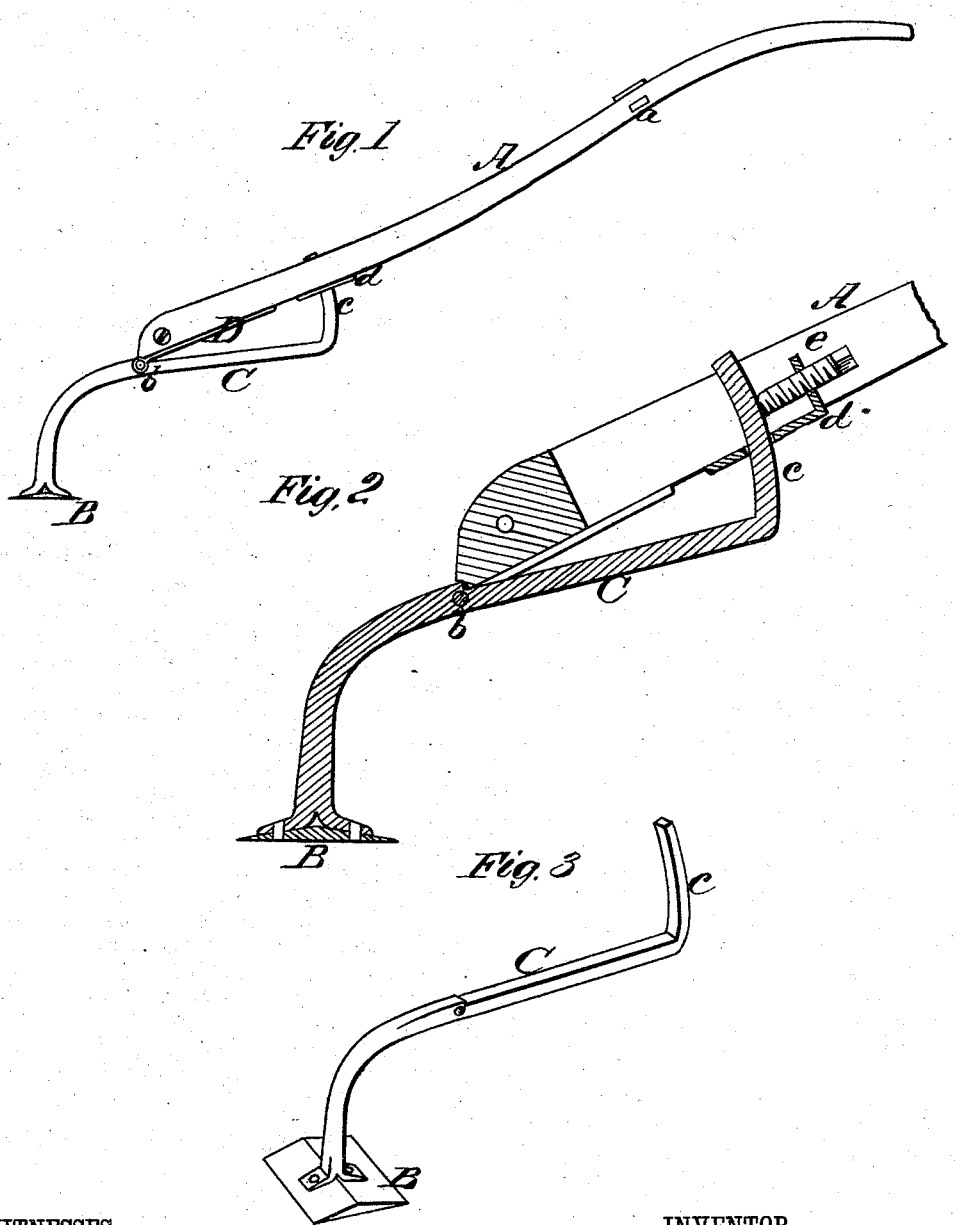

JEREMIAH HALL, OF SHELL ROCK, IOWA.

IMPROVEMENT IN CULTIVATORS.

Specification forming part of Letters Patent No. 156,482, dated November 3, 1874; application filed September 5, 1874.

*To all whom it may concern:*

Be it known that I, JEREMIAH HALL, of Shell Rock, in the county of Butler and State of Iowa, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my cultivator. Fig. 2 is a sectional view. Fig. 3 is a perspective view of the same.

This invention has relation to hand-cultivators for loosening the soil about the roots of plants and cutting up weeds; and it consists in a two-edged cutting-blade rigidly secured on the lower curved end of a shank, and pivoted to the connected ends of handles, in combination with a segment formed on the rear end of said shank and a clamping-screw, by means of which the implement can be adapted either for a man or boy, as will be hereinafter explained.

In the annexed drawings, A A designate two handles, which are rigidly secured together at their front ends, and connected together by a cross-bar, $a$, near their separated rear ends. B designates a cutting-blade having two cutting-edges. This blade is rigidly secured to the lower curved end of a shank, C, which is pivoted at $b$ to two metal straps, D, secured to the lower ends of the handles A, and which extends back and has a segment, $c$, formed on it concentric to the pivot $b$. The segment $c$ passes through and is guided by a plate, $d$, which is rigidly secured to the lower edges of the handles A, which plate prevents lateral displacement of the shank and its cutter. One edge of the plate $d$ is turned up and tapped to receive a binding-screw, $e$, the object of which is to rigidly confine the shank C when set for operation.

By loosening the screw $e$ the cutting-blade B can be adjusted, with respect to the handles of the implement, to suit persons of different heights.

What I claim as new, and desire to secure by Letters Patent, is—

The shank C, secured to the two-edged blade B, and pivoted to the handle A, and constructed with a segment, $c$, on one end, in combination with the guide-plate $d$ and set-screw $e$, substantially as described.

In testimony that I claim the above I have hereunto subscribed my name in the presence of two witnesses.

JEREMIAH HALL.

Witnesses:
  H. O. WALKER,
  J. H. BOOMER.